United States Patent
Ma (10) Patent No.: US 9,860,875 B2
(45) Date of Patent: Jan. 2, 2018

(54) METHOD FOR CONTROLLING DSRC RESOURCE ALLOCATION, BASE STATION, AND VEHICLE COMMUNICATIONS TERMINAL

(71) Applicant: Huawei Technologies Co., Ltd., Shenzhen (CN)

(72) Inventor: Jie Ma, Beijing (CN)

(73) Assignee: Huawei Technologies Co., Ltd.

( * ) Notice: Subject to any disclaimer, the term of this patent is extended or adjusted under 35 U.S.C. 154(b) by 0 days.

(21) Appl. No.: 15/256,102

(22) Filed: Sep. 2, 2016

(65) Prior Publication Data

US 2016/0374054 A1    Dec. 22, 2016

Related U.S. Application Data

(63) Continuation of application No. PCT/CN2014/091000, filed on Nov. 13, 2014.

(30) Foreign Application Priority Data

Mar. 5, 2014    (CN) .......................... 2014 1 0079768

(51) Int. Cl.
*H04W 4/00* (2009.01)
*H04W 72/04* (2009.01)
(Continued)

(52) U.S. Cl.
CPC ......... *H04W 72/04* (2013.01); *B61L 15/0027* (2013.01); *G08G 1/0112* (2013.01);
(Continued)

(58) Field of Classification Search
CPC ...................................................... H04W 72/04
(Continued)

(56) References Cited

U.S. PATENT DOCUMENTS

2006/0106671 A1    5/2006   Biet
2010/0189046 A1    7/2010   Baker et al.
(Continued)

FOREIGN PATENT DOCUMENTS

CN    102832974 A    12/2012
CN    103247085 A     8/2013
(Continued)

*Primary Examiner* — Joel Ajayi
(74) *Attorney, Agent, or Firm* — Leydig, Voit & Mayer, Ltd.

(57) ABSTRACT

Embodiments of the present invention are applicable to the field of the Internet of Vehicles, and provides a method for controlling DSRC resource allocation, a base station, and a vehicle communications terminal. The vehicle communications terminal includes a dedicated short range communications (DSRC) processor and a cellular mobile communications processor. The DSRC processor and the cellular mobile communications processor are connected to each other by an interface. The DSRC processor is configured to be in a wireless connection to a DSRC processor in another vehicle communications terminal to implement wireless communication between vehicles. The cellular mobile communications processor is configured to send and receive messages for the DSRC processor. According to the present invention, a base station can control a DSRC resource, and flexibly adjust a resource configuration parameter, thereby implementing DSRC congestion control, and adjusting a configuration according to a scenario.

10 Claims, 6 Drawing Sheets

(51) Int. Cl.
  *B61L 15/00* (2006.01)
  *G08G 1/01* (2006.01)
  *G08G 1/0967* (2006.01)
  *H04W 4/04* (2009.01)
  *H04W 92/04* (2009.01)

(52) U.S. Cl.
  CPC ......... *G08G 1/0133* (2013.01); *G08G 1/0141* (2013.01); *G08G 1/096716* (2013.01); *G08G 1/096741* (2013.01); *G08G 1/096775* (2013.01); *H04W 4/008* (2013.01); *H04W 4/046* (2013.01); *H04W 92/04* (2013.01)

(58) Field of Classification Search
  USPC .................................. 455/404.1, 422.1, 427
  See application file for complete search history.

(56) References Cited

U.S. PATENT DOCUMENTS

| | | |
|---|---|---|
| 2012/0158820 A1 | 6/2012 | Bai et al. |
| 2013/0308549 A1 | 11/2013 | Madan et al. |
| 2013/0322413 A1 | 12/2013 | Pelletier et al. |
| 2014/0051346 A1 | 2/2014 | Li et al. |

FOREIGN PATENT DOCUMENTS

| | | |
|---|---|---|
| CN | 103476091 A | 12/2013 |
| CN | 103533559 A | 1/2014 |
| EP | 2129007 A1 | 12/2009 |
| KR | 20020045795 A | 6/2002 |
| WO | WO 2012121751 A1 | 9/2012 |
| WO | 2014012244 A1 | 1/2014 |

FIG. 8

METHOD FOR CONTROLLING DSRC RESOURCE ALLOCATION, BASE STATION, AND VEHICLE COMMUNICATIONS TERMINAL

CROSS-REFERENCE TO RELATED APPLICATIONS

This application is a continuation of International Application No. PCT/CN2014/091000, filed on Nov. 13, 2014, which claims priority to Chinese Patent Application No. 201410079768.2, filed on Mar. 5, 2014, both of which are hereby incorporated by reference in their entireties.

TECHNICAL FIELD

Embodiments of the present invention pertain to the field of the Internet of Vehicles, and in particular, to a method for controlling dedicated short range communications (DSRC) resource allocation, a base station, and a vehicle communications terminal.

BACKGROUND

The Internet of Vehicles is a vehicle interconnect network. A vehicle communications terminal is mounted on each vehicle in the Internet of Vehicles, and inter-vehicle communication is implemented between vehicles by using vehicle communications terminals mounted on the vehicles and by using a mobile communications network, thereby implementing an interconnection between the vehicles. In the United States, a vehicle communications terminal using a DSRC technology is developed, and after vehicle communications terminals using the DSRC technology are mounted on vehicles, wireless communication between the vehicles can be implemented.

A frequency used by the DSRC technology is a spectrum of 5.9 GHz. A characteristic of this spectrum is that for line-of-sight transmission, a receiving correctness rate is high within a data transmission distance range, and for non line of sight, that is, when there is an obstruction, data receiving correctness is poor. Therefore, the DSRC technology can achieve a desirable effect when used in the line of sight within a range of 300 meters.

Services of the Internet of Vehicles are classified into three types. A first type is information entertainment services, where passengers in vehicles can do various entertainment activities by using a communications network. A second type is vehicle efficiency type information services, where the information is released by a road administration department or a participant on a road, and mainly includes information such as road congestion information, road construction information, a speed limit of a road section, weather on a road section, and whether a road is passable. A third type is vehicle safety information, that is, information for avoiding collision, such as a vehicle in front being suddenly stopped, a vehicle in front making a turn, or a vehicle coming from the opposite direction. Information of the first type is generally obtained from the cloud, in communication manners such as 3G and 4G, and a network that covers a wide area needs to be used. For information of the second type, the information may also be released in a same manner as the information of the first type, that is, by using a mobile communications network, or may be released by using a short-range communications technology. When the short-range communications technology is used, road side units (RSU) of a particular density need to be mounted on a road. Because information of the third type is driving information of vehicles, and the vehicles generally move fast, a communication delay needs to be less than 100 ms so as to achieve a collision avoiding effect. Because coverage of a cellular network is too wide, and a link establishment process is relatively complex, it is difficult to ensure a delay. Therefore, a direct vehicle-to-vehicle communication technology, such as the DSRC technology, is suitable for communication to complete information sending of a relatively short distance and a high delay requirement.

Although the DSRC technology is applicable to short-range direct communication transmission, the DSRC technology has extremely serious disadvantages: (1) A frame length of a physical layer of DSRC is variable, and therefore it is impossible to determine available resources, and available resources are reduced when a user sends a large data packet, thereby intensifying contention. (2) A contention process is required each time a vehicle communications terminal sends one data packet, and in a case in which long-term sending or regular sending needs to be performed, not only much time is wasted, but also a quantity of contention times is increased.

For a vehicle safety message that has a high delay requirement, the industry believes that it shall be ensured that a transmission delay is less than 100 ms. An actual link simulation and test result shows that when more than 160 vehicles exist in an area, a transmission delay of a vehicle safety message is far greater than 100 ms.

With respect to deployment and use, the DSRC technology requires RSU deployment, so as to really achieve an objective of intelligent transportation. However, the reality is that neither a vehicle manufacturer nor a road operator is willing to deploy an RSU because the RSU deployment needs to be highly dense, costs of initial mounting and maintenance are huge, and a current profit model seems unclear.

In conclusion, vehicle communications terminals in the prior art use the DSRC technology, and because the frame length of the physical layer of DSRC is variable, resource efficiency is low. In addition, a contention manner causes a transmission delay to fail to meet a requirement for safe vehicle communication in a scenario of highly dense vehicles.

SUMMARY

Technical Problem

An objective of the present invention is to provide a method for controlling DSRC resource allocation, a base station, and a vehicle communications terminal, so as to resolve the following problems: vehicle communications terminals in the prior art use a DSRC technology, and because a frame length of a physical layer of DSRC is variable, resource efficiency is low. In addition, a contention manner causes a transmission delay to fail to meet a requirement for safe vehicle communication in a scenario of highly dense vehicles.

Technical Solution

According to a first aspect, the present invention provides a vehicle communications terminal, the vehicle communications terminal includes a dedicated short range communications DSRC module and a cellular mobile communications module, and the DSRC module and the cellular mobile communications module are connected to each other by using an interface;

the DSRC module is configured to be in a wireless connection to a DSRC module in another vehicle communications terminal to implement wireless communication between vehicles; and the cellular mobile communications module is configured to: receive a resource allocation control message for the DSRC module from a base station, forward the resource allocation control message to the DSRC module by using the interface, and receive a resource allocation request message that is forwarded by the DSRC module to the cellular mobile communications module by using the interface and is therefore sent by the cellular mobile communications module to the base station.

With reference to the first aspect, in a first possible implementation manner of the first aspect, the interface is a communication management CM interface; and that the DSRC module and the cellular mobile communications module are connected to each other by using an interface is specifically: a radio resource control RRC protocol layer of the cellular mobile communications module and a radio resource control-wave (RRC-W) layer of the DSRC module are connected by using the CM interface.

According to a second aspect, the present invention provides a method for controlling dedicated short range communications DSRC resource allocation, and the method includes:

broadcasting, by a base station, a DSRC spectrum parameter to a vehicle communications terminal whose cellular mobile communications module camps on a cell established by the base station, so that a DSRC module of the vehicle communications terminal configures the DSRC module according to the DSRC spectrum parameter, where the vehicle communications terminal includes the DSRC module and the cellular mobile communications module, and the DSRC module and the cellular mobile communications module are connected to each other by using an interface.

With reference to the second aspect, in a first possible implementation manner of the second aspect, for a periodic safety type message, if the DSRC module of the vehicle communications terminal needs to send a message to another vehicle communications terminal, before the broadcasting, by a base station, a DSRC spectrum parameter to a vehicle communications terminal whose cellular mobile communications module camps on a cell established by the base station, the method further includes:

receiving, by the base station, a resource allocation request message sent by the cellular mobile communications module of the vehicle communications terminal, where the resource allocation request message is transmitted to the cellular mobile communications module by the DSRC module of the vehicle communications terminal by using the interface;

generating, by the base station, a resource allocation control message for the DSRC module according to the resource allocation request message; and sending, by the base station, the resource allocation control message for the DSRC module to the cellular mobile communications module, so that the cellular mobile communications module forwards the resource allocation control message to the DSRC module by using the interface.

With reference to the second aspect, in a second possible implementation manner of the second aspect, the DSRC spectrum parameter specifically includes: a DSRC frame structure parameter and a correspondence among a vehicle safety message type, a DSRC resource allocation manner, and a subframe number.

According to a third aspect, the present invention provides a method for controlling dedicated short range communications DSRC resource allocation, and the method includes:

receiving, by a cellular mobile communications module of a vehicle communications terminal, a DSRC spectrum parameter broadcast by a base station to the vehicle communications terminal whose cellular mobile communications module camps on a cell established by the base station, where the vehicle communications terminal includes a DSRC module and the cellular mobile communications module, and the DSRC module and the cellular mobile communications module are connected to each other by using an interface;

transmitting, by the cellular mobile communications module of the vehicle communications terminal, the DSRC spectrum parameter to the DSRC module by using the interface; and configuring, by the DSRC module of the vehicle communications terminal, the DSRC module according to the DSRC spectrum parameter.

With reference to the third aspect, in a first possible implementation manner of the third aspect, the DSRC spectrum parameter specifically includes: a DSRC frame structure parameter and a correspondence among a vehicle safety message type, a DSRC resource allocation manner, and a subframe number.

With reference to the third aspect, in a second possible implementation manner of the third aspect, the receiving, by a cellular mobile communications module of a vehicle communications terminal, a DSRC spectrum parameter broadcast by a base station to the vehicle communications terminal whose cellular mobile communications module camps on a cell established by the base station is specifically:

receiving, by a physical layer of the cellular mobile communications module of the vehicle communications terminal, the DSRC spectrum parameter broadcast by the base station to the vehicle communications terminal whose cellular mobile communications module camps on the cell established by the base station.

With reference to the third aspect, in a third possible implementation manner of the third aspect, the transmitting, by the cellular mobile communications module of the vehicle communications terminal, the DSRC spectrum parameter to the DSRC module by using the interface specifically includes:

transferring, by the physical layer of the cellular mobile communications module of the vehicle communications terminal, the DSRC spectrum parameter to a radio resource control (RRC) protocol layer;

determining, by the RRC layer by means of parsing, that the DSRC spectrum parameter is configuration information of the DSRC module, and transferring the DSRC spectrum parameter to a communication management (CM) interface; and transmitting, by the CM interface, the DSRC spectrum parameter to a radio resource control protocol-wave (RRC-W) layer of the DSRC module.

With reference to the third aspect, in a fourth possible implementation manner of the third aspect, the configuring, by the DSRC module of the vehicle communications terminal, the DSRC module according to the DSRC spectrum parameter is specifically:

configuring, by the RRC—W layer of the DSRC module of the vehicle communications terminal, a logical link control (LLC) layer, a Media Access Control (MAC) layer, and a physical layer of the DSRC module according to the DSRC spectrum parameter; and after configuration is completed, returning, by the RRC—W layer, a configuration complete message to the CM interface.

With reference to the third aspect, in a fifth possible implementation manner of the third aspect, after the configuring, by the DSRC module of the vehicle communications terminal, the DSRC module according to the DSRC spectrum parameter, the method further includes:

sending, by the DSRC module of the vehicle communications terminal, a message to another vehicle communications terminal and receiving a message sent by the another vehicle communications terminal.

With reference to the third aspect, in a sixth possible implementation manner of the third aspect, for a periodic safety type message, if the DSRC module of the vehicle communications terminal needs to send a message to another vehicle communications terminal, before the receiving, by a cellular mobile communications module of a vehicle communications terminal, a DSRC spectrum parameter broadcast by a base station to the vehicle communications terminal whose cellular mobile communications module camps on a cell established by the base station, the method further includes:

transmitting, by the DSRC module of the vehicle communications terminal, a resource allocation request message to the cellular mobile communications module by using the interface;

sending, by the cellular mobile communications module, the resource allocation request message to the base station, so that the base station generates a resource allocation control message for the DSRC module according to the resource allocation request message;

receiving, by the cellular mobile communications module, the resource allocation control message that is for the DSRC module and that is sent by the base station to the cellular mobile communications module; and forwarding, by the cellular mobile communications module, the resource allocation control message to the DSRC module by using the interface.

According to a fourth aspect, the present invention provides a base station, and the base station includes:

a broadcast module, configured to broadcast a DSRC spectrum parameter to a vehicle communications terminal whose cellular mobile communications module camps on a cell established by the base station, so that a DSRC module of the vehicle communications terminal configures the DSRC module according to the DSRC spectrum parameter, where the vehicle communications terminal includes the DSRC module and the cellular mobile communications module, and the DSRC module and the cellular mobile communications module are connected to each other by using an interface.

With reference to the fourth aspect, in a first possible implementation manner of the fourth aspect, for a periodic safety type message, if the DSRC module of the vehicle communications terminal needs to send a message to another vehicle communications terminal, the base station further includes:

a first receiving module, configured to receive a resource allocation request message sent by the cellular mobile communications module of the vehicle communications terminal, where the resource allocation request message is transmitted to the cellular mobile communications module by the DSRC module of the vehicle communications terminal by using the interface;

a first generation module, configured to generate a resource allocation control message for the DSRC module according to the resource allocation request message; and a first sending module, configured to send the resource allocation control message for the DSRC module to the cellular mobile communications module, so that the cellular mobile communications module forwards the resource allocation control message to the DSRC module by using the interface.

Beneficial Effect

In the present invention, because a vehicle communications terminal includes a DSRC module and a cellular mobile communications module, a base station can control a DSRC resource, and flexibly adjust a resource configuration parameter, thereby implementing DSRC congestion control, and adjusting a configuration according to a scenario.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

To describe the technical solutions of the present invention, the following uses the specific embodiments for description.

Embodiment 1

Figure 1:
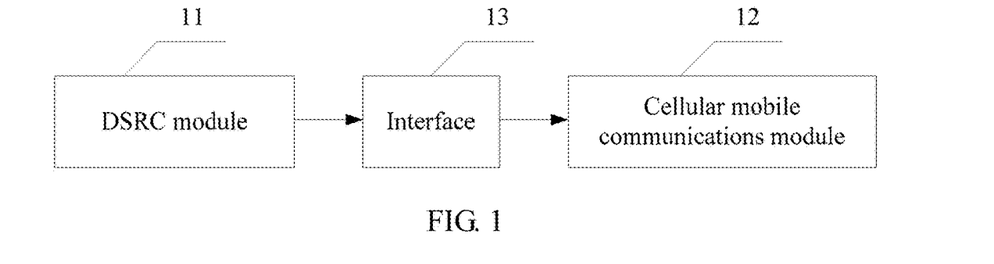
FIG. 1 is a schematic structural diagram of a vehicle communications terminal according to Embodiment 1 of the present invention.

Referring to FIG. 1, Embodiment 1 of the present invention provides a vehicle communications terminal, including a DSRC module 11 and a cellular mobile communications module 12. The DSRC module 11 and the cellular mobile communications module 12 are connected to each other by using an interface 13. The DSRC module 11 is configured to be in a wireless connection to a DSRC module in another vehicle communications terminal to implement wireless communication between vehicles. The cellular mobile communications module 12 is configured to: receive a resource allocation control message for the DSRC module 11 from a base station, forward the resource allocation control message to the DSRC module 11 by using the interface 13, and receive a resource allocation request message that is forwarded by the DSRC module 11 to the cellular mobile communications module 12 by using the interface 13 and is therefore sent by the cellular mobile communications module 12 to the base station.

Figure 2:
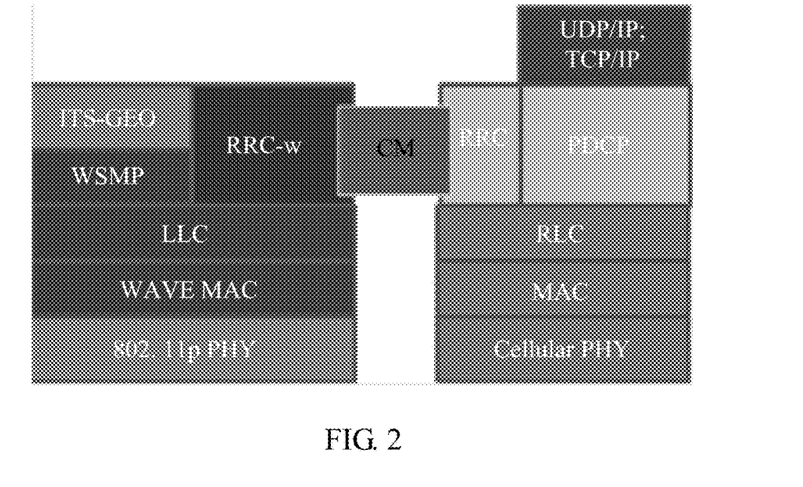
FIG. 2 is a schematic diagram of a protocol stack in a vehicle communications terminal according to Embodiment 1 of the present invention.

In Embodiment 1 of the present invention, the interface 13 may be specifically a CM (communication management) interface. That the DSRC module 11 and the cellular mobile communications module 12 are connected to each other by using an interface 13 may be specifically: an RRC (radio resource control) protocol layer of the cellular mobile communications module 12 and an RRC-W (radio resource control-wave) layer of the DSRC module 11 are connected by using the CM interface. The base station may be an LTE (Long Term Evolution) base station. Division of a protocol stack in the vehicle communications terminal provided in Embodiment 1 of the present invention is shown in FIG. 2.

In Embodiment 1 of the present invention, because a vehicle communications terminal includes a DSRC module and a cellular mobile communications module, a base station can control a DSRC resource, and flexibly adjust a resource configuration parameter, thereby implementing DSRC congestion control, and adjusting a configuration according to a scenario.

Embodiment 2

Figure 3:
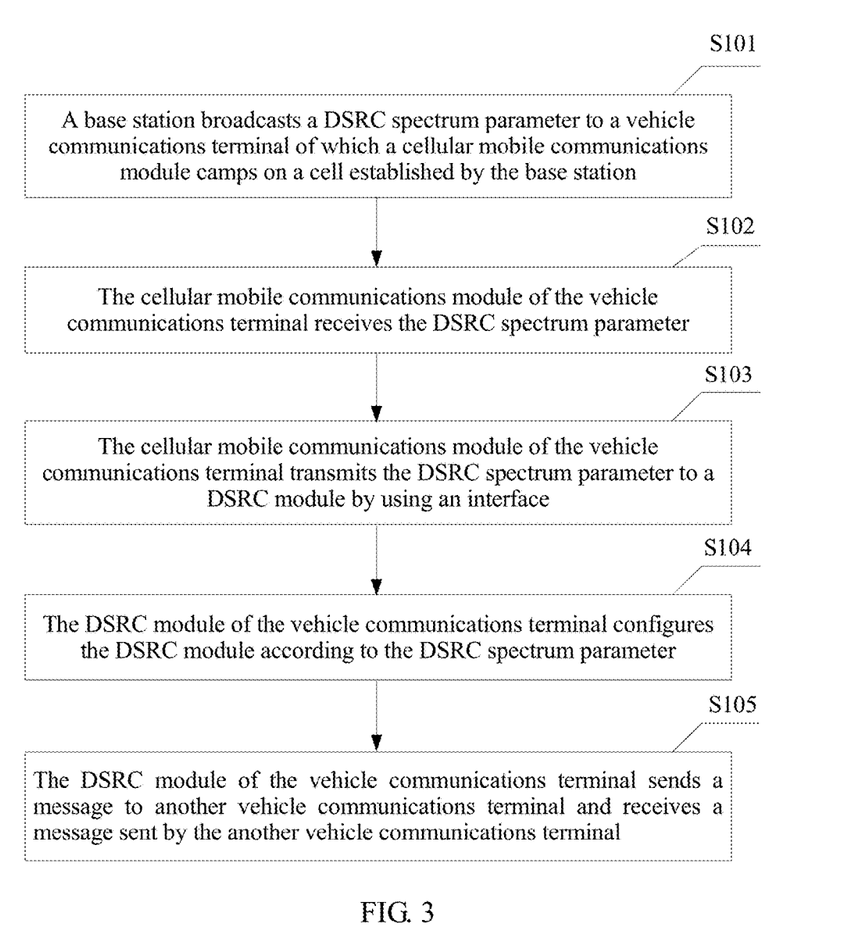
FIG. 3 is a flowchart of a method for controlling DSRC resource allocation according to Embodiment 2 of the present invention.

Referring to FIG. 3, a method for controlling DSRC resource allocation according to Embodiment 2 of the present invention includes the following steps:

S101. A base station broadcasts a DSRC spectrum parameter to a vehicle communications terminal whose cellular mobile communications module camps on a cell established by the base station.

In Embodiment 2 of the present invention, the vehicle communications terminal includes a DSRC module and the cellular mobile communications module, the DSRC module and the cellular mobile communications module are connected to each other by using an interface, and the base station may be an LTE base station.

The DSRC spectrum parameter may specifically include: a DSRC frame structure parameter, a correspondence among a vehicle safety message type, a DSRC resource allocation manner, and a subframe number, and the like. The DSRC frame structure parameter includes: a starting time of each frame, a frame length, a quantity of subframes in one frame, and a preamble portion length and a data portion length of each subframe.

Figure 4:
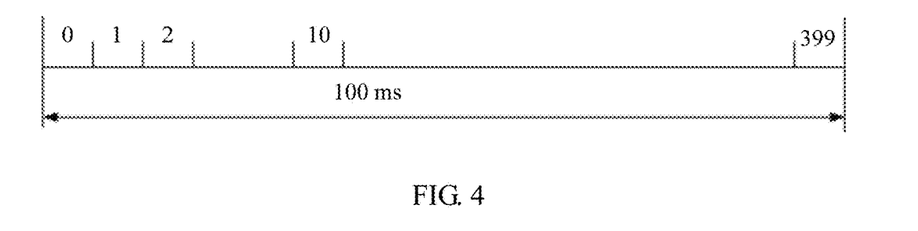
FIG. 4 is a schematic diagram of a DSRC frame length in a method for controlling DSRC resource allocation according to Embodiment 2 of the present invention.
Figure 5:
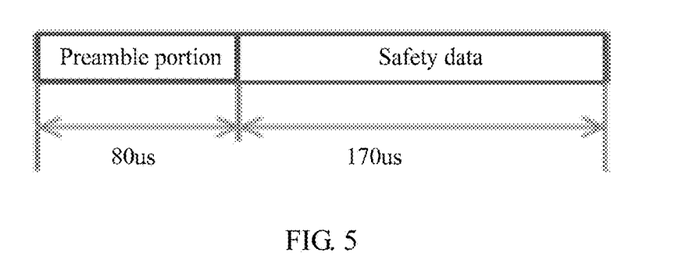
FIG. 5 is a schematic diagram of a DSRC subframe in a method for controlling DSRC resource allocation according to Embodiment 2 of the present invention.

A DSRC frame length is shown in FIG. 4, the frame length is 100 ms, and there are 400 subframes in one frame. A subframe structure is shown in FIG. 5.

The starting time of each frame has multiple types of time references: One is using a clock provided by a satellite positioning system, for example, clock timing provided by the Global Positioning System (GPS) or the BeiDou system. An offset of such timing is extremely small, and may be a magnitude of a several hundred nanoseconds. Because a road is generally in the open air, there is no difficulty in receiving a clock of a satellite positioning system. Another one is, in a tunnel or another scenario in which a signal from a satellite positioning system cannot be received, using timing provided by the base station, where the timing is generally timing of transmission of a downlink broadcast channel of the base station.

A method for representing the starting time of each frame is exemplarily described as follows:

When the clock provided by the satellite positioning system is used: it is assumed that precision that can be provided by the satellite positioning system is 100 ns, and a number that represents time is a 12-digit decimal number, that is, $10^{12}*0.1$ us=$10^{11}$ us. It is specified that a moment is a starting point of a frame, that is, a moment of 000000000000, and a moment of A that mod 100 ms is 1 us is a starting moment of each frame.

When the timing of transmission of the downlink broadcast channel of the base station is used: the base station broadcasts a system frame number on the broadcast channel, a time length of each system frame is 10 ms, and each timeslot Ts in the downlink of LTE is 32.6 ns. A method for specifying a moment as a starting point of a frame is: a Ts of a subframe of a frame, for example, timeslot 2690 of subframe 7 of LTE frame number 3.

Figure 6:
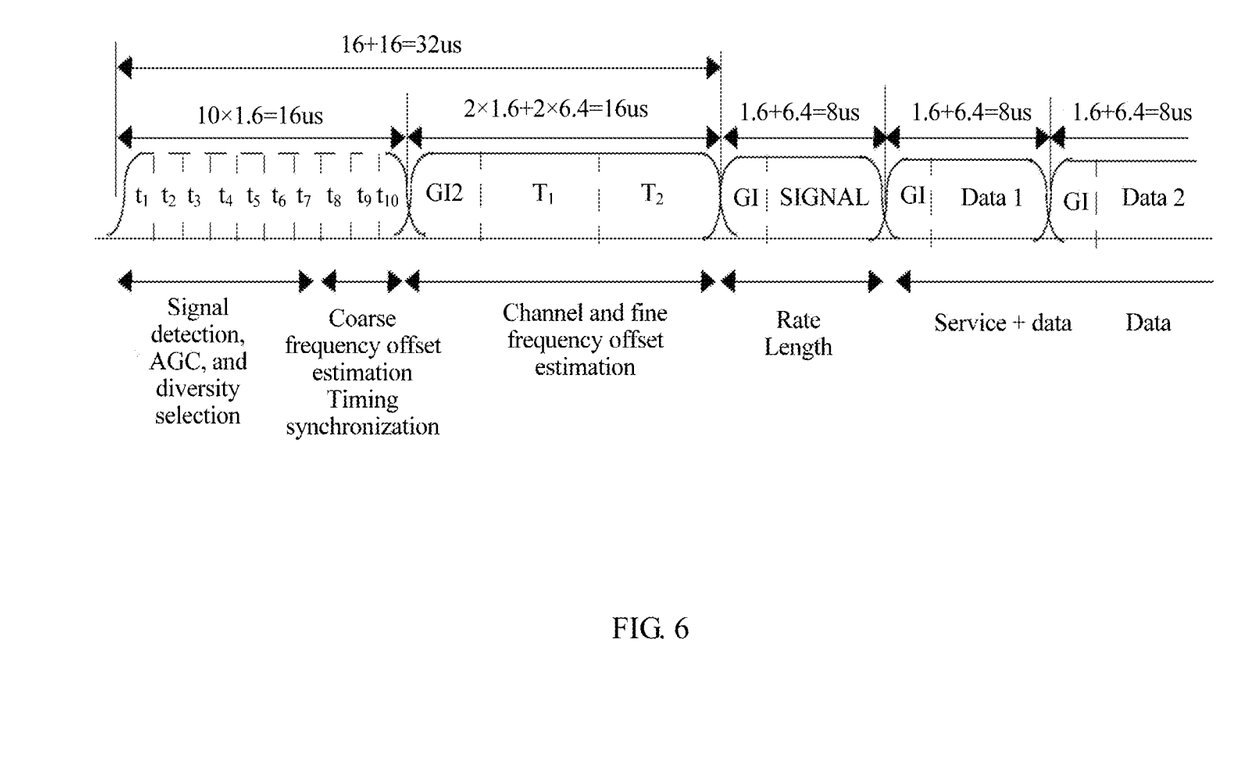
FIG. 6 is a schematic diagram of a physical layer format of a data portion of a DSRC subframe in a method for controlling DSRC resource allocation according to Embodiment 2 of the present invention.
Figure 7:
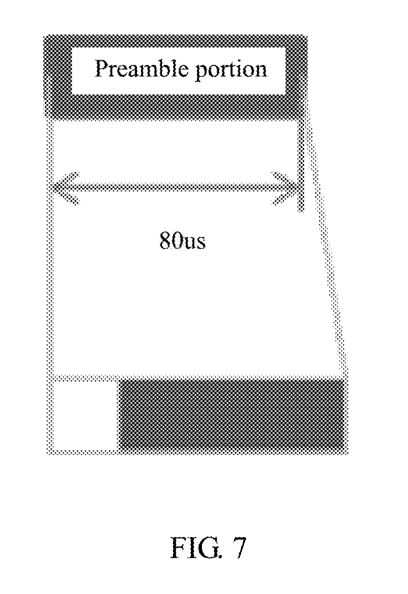
FIG. 7 is a schematic diagram of a preamble portion of the DSRC subframe in a method for controlling DSRC resource allocation according to Embodiment 2 of the present invention.

A physical layer format of a data portion of a DSRC subframe is the same as that of 802.11p (as shown in FIG. 6). A preamble portion (as shown in FIG. 7) of the DSRC subframe includes a GP (guard period), and the GP is used for receive/transmit transition of the vehicle communications terminal and accommodation of non-ideal synchronization caused by a timing offset. A blank part in FIG. 7 is a GP, and a size of the GP is related to a transition time and a synchronization offset. A reserved time length may be specified by the base station, for example, 32 us can generally meet the receive/transmit transition and a synchronization offset.

In Embodiment 2 of the present invention, the vehicle safety message type includes a burst safety type message and a periodic safety type message, and the DSRC resource allocation manner includes a base station pre-allocation manner and a contention manner. The correspondence among the vehicle safety message type, the DSRC resource allocation manner, and the message sending subframe number is exemplarily described as follows:

Subframes 0-10 are used to send the burst safety type message, and are obtained by the vehicle communications terminal in a contention manner.

Subframes 11-399 are used to send the periodic safety type message, and the vehicle communications terminal obtains a resource in the base station pre-allocation manner.

S102. The cellular mobile communications module of the vehicle communications terminal receives the DSRC spectrum parameter.

In Embodiment 2 of the present invention, S102 is specifically:

receiving, by a physical layer (cellular PHY in FIG. 2) of the cellular mobile communications module of the vehicle communications terminal, the DSRC spectrum parameter.

S103. The cellular mobile communications module of the vehicle communications terminal transmits the DSRC spectrum parameter to a DSRC module by using an interface.

In Embodiment 2 of the present invention, S103 specifically includes the following steps:

transferring, by the physical layer of the cellular mobile communications module of the vehicle communications terminal, the DSRC spectrum parameter to an RRC layer;

determining, by the RRC layer by means of parsing, that the DSRC spectrum parameter is configuration information of the DSRC module, and transferring the DSRC spectrum parameter to a CM interface; and transmitting, by the CM interface, the DSRC spectrum parameter to an RRC—W layer of the DSRC module.

S104. The DSRC module of the vehicle communications terminal configures the DSRC module according to the DSRC spectrum parameter.

In Embodiment 2 of the present invention, S104 is specifically:

configuring, by the RRC—W layer of the DSRC module of the vehicle communications terminal, an LLC (logical link control) layer, a MAC (Media Access Control) layer (that is, WAVE MAC in FIG. 2), and a physical layer (802.11pPHY in FIG. 2) of the DSRC module according to the DSRC spectrum parameter; and after configuration is completed, returning, by the RRC—W layer, a configuration complete message to the CM interface, where after the configuration is completed, the vehicle communications terminal may perform direct vehicle-to-vehicle communication with another vehicle communications terminal.

In addition to the DSRC frame structure parameter (for example, the starting time of each frame, the frame length, the quantity of subframes in one frame, and the preamble portion length and the data portion length of each subframe), configured parameters may further include: a classification of a priority of using a safety message at the MAC layer, whether packet disassembly and packet assembly are allowed at the LLC layer, rules of the packet disassembly and packet assembly, and the like, where the rules of the packet disassembly and packet assembly include, for example, a maximum quantity of bytes of each packet and a maximum quantity of retransmissions.

In Embodiment 2 of the present invention, after S104, the method may further include the following step:

S105. The DSRC module of the vehicle communications terminal sends a message to another vehicle communications terminal and receives a message sent by another vehicle communications terminal.

The DSRC module of the vehicle communications terminal receives, according to each frame, the message sent by the another vehicle communications terminal.

For the periodic safety type message, if the DSRC module of the vehicle communications terminal needs to send the message to the another vehicle communications terminal, before S101, the method further includes the following steps:

transmitting, by the DSRC module of the vehicle communications terminal, a resource allocation request message to the cellular mobile communications module by using the interface, where the resource allocation request message carries a message type (periodic or burst), and for a periodic message, further carries a specific use period and use duration of each time;

sending, by the cellular mobile communications module, the resource allocation request message to the base station;

receiving, by the base station, the resource allocation request message sent by the cellular mobile communications module;

generating, by the base station, a resource allocation control message for the DSRC module according to the resource allocation request message, where content of the control message is content carried by physical layer signaling of the base station or a MAC control unit or an RRC layer message of the base station, and the control message carries a resource use period and use duration of each time;

sending, by the base station, the resource allocation control message for the DSRC module to the cellular mobile communications module;

receiving, by the cellular mobile communications module, the resource allocation control message for the DSRC module; and forwarding, by the cellular mobile communications module, the resource allocation control message to the DSRC module by using the interface.

Figure 8:
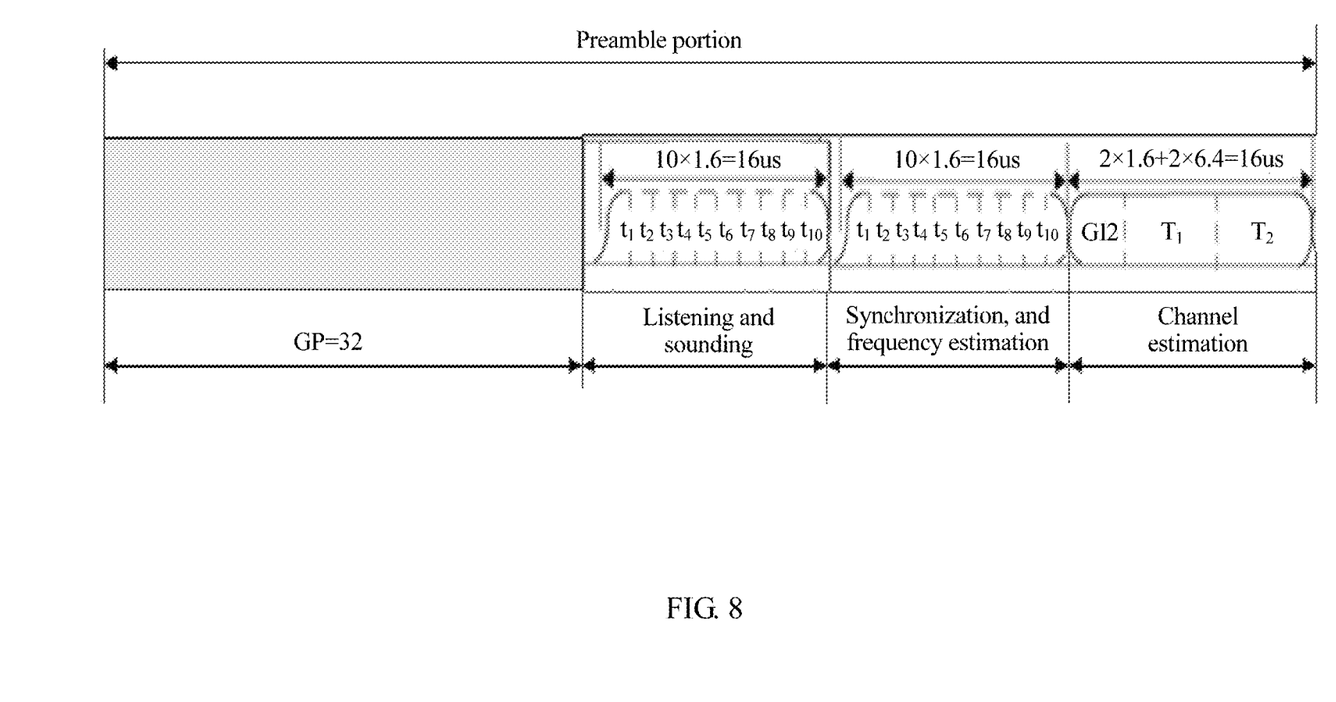
FIG. 8 is a schematic structural diagram of a preamble portion of a burst subframe in a method for controlling DSRC resource allocation according to Embodiment 2 of the present invention.

For the burst safety type message, that the DSRC module of the vehicle communications terminal sends the message to another vehicle communications terminal includes the following steps:

sending the burst safety type message in a burst subframe, of each DSRC frame, that is defined by the base station and is used to send a burst safety type message, for example, the foregoing subframes 0-10, where as shown in FIG. 8, a preamble portion of the burst subframe that is used to send the burst safety type message includes a sounding signal listening portion; the sounding signal listening portion is used for listening to a sounding signal, and a sender sends or listens to a sounding signal in this portion, so that another user learns, after listening to this portion, that the burst subframe is occupied, and the another user who wants to occupy the burst subframe backs off and does not send a subsequent signal; the sender randomly selects a time from this portion to start sending; if a user A chooses to perform sending at T1, and a user B chooses to perform sending at T3, the user B listens to, before performing sending, a listening sounding signal sent by the user A, and therefore stops subsequent sending; by means of this process, resource preemption is implemented;

if a burst safety message fails to occupy a resource in a burst subframe in a frame, sending may be performed on a periodic resource;

when a total packet length of the burst safety type message and the periodic safety type message exceeds a message length allowed by a periodic channel, the periodic safety type message may be discarded; after the periodic safety type message is discarded for multiple consecutive times, a priority of the periodic safety type message becomes higher, and the burst safety type message can no longer occupy a resource of the periodic safety type message; for example, the periodic safety type message is discarded for three consecutive times, and therefore, even if the burst safety type message cannot be sent in the burst subframe, the burst safety type message cannot occupy a resource of the periodic safety type message; in this case, the DSRC module sends a DSRC resource adjustment request message to the base station by using the cellular mobile communications module; specifically, the MAC layer of the DSRC module triggers transferring of a channel-state-is-busy message to the RRC—W layer, the RRC—W layer transfers the channel-state-is-busy message to the CM interface; the CM interface triggers the RRC layer of the cellular mobile communications module to generate the DSRC resource adjustment request message; and the physical layer of the cellular mobile communications module sends the DSRC resource adjustment request message to the base station;

receiving, by the base station, the DSRC resource adjustment request message;

determining, by the base station according to a quantity of received DSRC resource adjustment request messages or frequency of receiving the DSRC resource adjustment request messages, whether to adjust a DSRC resource, where an adjustment method is increasing a quantity of burst subframes used for sending the burst safety type message; and if it is determined to perform the adjustment, notifying, by the base station, a status of an adjusted DSRC resource and effective time by using broadcast signaling.

In Embodiment 2 of the present invention, because a vehicle communications terminal includes a DSRC module and a cellular mobile communications module, a base station can control a DSRC resource, and flexibly adjust a resource configuration parameter, thereby implementing DSRC congestion control, and adjusting a configuration according to a scenario.

Embodiment 3

A base station provided in Embodiment 3 of the present invention includes:

a broadcast module, configured to broadcast a DSRC spectrum parameter to a vehicle communications terminal whose cellular mobile communications module camps on a cell established by the base station, so that a DSRC module of the vehicle communications terminal configures the DSRC module according to the DSRC spectrum parameter, where the vehicle communications terminal includes the DSRC module and the cellular mobile communications module, and the DSRC module and the cellular mobile communications module are connected to each other by using an interface.

In Embodiment 3 of the present invention, for a periodic safety type message, if the DSRC module of the vehicle communications terminal needs to send a message to another vehicle communications terminal, the base station further includes:

a first receiving module, configured to receive a resource allocation request message sent by the cellular mobile communications module of the vehicle communications terminal, where the resource allocation request message is transmitted to the cellular mobile communications module by the DSRC module of the vehicle communications terminal by using the interface;

a first generation module, configured to generate a resource allocation control message for the DSRC module according to the resource allocation request message; and a first sending module, configured to send the resource allocation control message for the DSRC module to the cellular mobile communications module, so that the cellular mobile communications module forwards the resource allocation control message to the DSRC module by using the interface.

A person of ordinary skill in the art may understand that all or a part of the steps of the methods in the embodiments may be implemented by a program instructing relevant hardware. The program may be stored in a computer readable storage medium, such as a read-only memory (ROM), a random-access memory (RAM), a magnetic disc, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A vehicle communications terminal, wherein the vehicle communications terminal comprises a dedicated short range communications (DSRC) processor, a cellular mobile communications processor, and non-transitory computer-readable storage media for each processor including computer-executable instructions executed by the corresponding processors to perform operations on the vehicle communications terminal, wherein the DSRC processor and the cellular mobile communications processor are connected to each other by an interface;

the DSRC processor is configured to be in a wireless connection to a DSRC processor in another vehicle communications terminal to implement wireless communication between vehicles; and the operations executed on the vehicle communications terminal comprise:

receiving, by the cellular mobile communications processor, a resource allocation control message for the DSRC processor from a base station, forwarding, by the cellular mobile communications processor, the resource allocation control message to the DSRC processor through the interface, forwarding, by the DSRC processor, a resource allocation request message to the cellular mobile communications processor, receiving, by the cellular mobile communications processor, the resource allocation request message that is forwarded by the DSRC processor to the cellular mobile communications processor through the interface, and sending, by the cellular mobile communications processor, the resource allocation request message forwarded by the DSRC processor to the base station.

2. The vehicle communications terminal according to claim 1, wherein the interface is a communication management (CM) interface; and that the DSRC processor and the cellular mobile communications processor are connected to each other by the CM interface comprising: a radio resource control (RRC) protocol layer of the cellular mobile communications processor and a radio resource control-wave (RRC-W) layer of the DSRC processor.

3. A method for controlling dedicated short range communications (DSRC) resource allocation, wherein the method comprises:

receiving, by a cellular mobile communications processor of a vehicle communications terminal, a DSRC spectrum parameter broadcast by a base station to the vehicle communications terminal whose cellular mobile communications processor camps on a cell established by the base station, wherein the vehicle communications terminal comprises a DSRC processor and the cellular mobile communications processor, and the DSRC processor and the cellular mobile communications processor are connected to each other by an interface;

transmitting, by the cellular mobile communications processor of the vehicle communications terminal, the DSRC spectrum parameter to the DSRC processor through the interface;

configuring, by the DSRC processor of the vehicle communications terminal, the DSRC processor according to the DSRC spectrum parameter; and transmitting, by the DSRC processor of the vehicle communications terminal, a resource allocation request message to the cellular mobile communications processor through the interface;

sending, by the cellular mobile communications processor, the resource allocation request message to the base station, so that the base station generates a resource allocation control message for the DSRC processor according to the resource allocation request message;

receiving, by the cellular mobile communications processor, the resource allocation control message that is for the DSRC processor and that is sent by the base station to the cellular mobile communications processor; and forwarding, by the cellular mobile communications processor, the resource allocation control message to the DSRC processor through the interface.

4. The method according to claim 3, wherein the DSRC spectrum parameter comprises: a DSRC frame structure parameter and a correspondence among a vehicle safety message type, a DSRC resource allocation manner, and a subframe number.

5. The method according to claim 3, wherein the receiving, by a cellular mobile communications processor of a vehicle communications terminal, a DSRC spectrum parameter broadcast by a base station to the vehicle communications terminal whose cellular mobile communications processor camps on a cell established by the base station comprises:

receiving, by a physical layer of the cellular mobile communications processor of the vehicle communications terminal, the DSRC spectrum parameter broadcast by the base station to the vehicle communications terminal whose cellular mobile communications processor camps on the cell established by the base station.

6. The method according to claim 4, wherein the receiving, by a cellular mobile communications processor of a vehicle communications terminal, a DSRC spectrum parameter broadcast by a base station to the vehicle communications terminal whose cellular mobile communications processor camps on a cell established by the base station comprises:

receiving, by a physical layer of the cellular mobile communications processor of the vehicle communications terminal, the DSRC spectrum parameter broadcast by the base station to the vehicle communications terminal whose cellular mobile communications processor camps on the cell established by the base station.

7. The method according to claim 3, wherein the transmitting, by the cellular mobile communications processor of the vehicle communications terminal, the DSRC spectrum parameter to the DSRC processor through the interface comprises:

transferring, by the physical layer of the cellular mobile communications processor of the vehicle communications terminal, the DSRC spectrum parameter to a radio resource control (RRC) protocol layer;

parsing, by the RRC layer, to determine that the DSRC spectrum parameter is configuration information of the DSRC processor, and transferring the DSRC spectrum parameter to a communication management (CM) interface; and transmitting, by the CM interface, the DSRC spectrum parameter to a radio resource control protocol-wave (RRC-W) layer of the DSRC processor.

8. The method according to claim 3, wherein the configuring, by the DSRC processor of the vehicle communications terminal, the DSRC processor according to the DSRC spectrum parameter comprises:

configuring, by a radio resource control protocol-wave (RRC-W) layer of the DSRC processor of the vehicle communications terminal, a logical link control (LLC) layer, a Media Access Control (MAC) layer, and a physical layer of the DSRC processor according to the DSRC spectrum parameter; and after configuration is completed, returning, by the RRC-W layer, a configuration complete message to the CM interface.

9. The method according to claim 3, wherein after the configuring, by the DSRC processor of the vehicle communications terminal, the DSRC processor according to the DSRC spectrum parameter, the method further comprises:

sending, by the DSRC processor of the vehicle communications terminal, a message to another vehicle communications terminal and receiving a message sent by the another vehicle communications terminal.

10. A base station, wherein the base station comprises: a computing hardware; and a non-transitory computer-readable storage medium including computer-executable instructions executed by the computing hardware to perform, on the base station, operations comprising:

broadcasting a dedicated short range communications (DSRC) spectrum parameter to a vehicle communications terminal whose cellular mobile communications processor camps on a cell established by the base station, so that a DSRC processor of the vehicle communications terminal configures the DSRC processor according to the DSRC spectrum parameter, wherein the vehicle communications terminal comprises the DSRC processor and the cellular mobile communications processor, and the DSRC processor and the cellular mobile communications processor are connected to each other by an interface; and receiving a resource allocation request message sent by the cellular mobile communications processor of the vehicle communications terminal, wherein the resource allocation request message is transmitted to the cellular mobile communications processor by the DSRC processor of the vehicle communications terminal through the interface;

generating a resource allocation control message for the DSRC processor according to the resource allocation request message;

sending the resource allocation control message for the DSRC processor to the cellular mobile communications processor; and forwarding, by the cellular mobile communications processor, the resource allocation control message to the DSRC processor through the interface.

* * * * *

UNITED STATES PATENT AND TRADEMARK OFFICE
CERTIFICATE OF CORRECTION

PATENT NO.          : 9,860,875 B2                                   Page 1 of 1
APPLICATION NO.     : 15/256102
DATED               : January 2, 2018
INVENTOR(S)         : Jie Ma It is certified that error appears in the above-identified patent and that said Letters Patent is hereby corrected as shown below:

On the Title Page

City/Country for Assignee should read -- Shenzhen (CN) --.

Signed and Sealed this
Eighteenth Day of December, 2018

Andrei Iancu
*Director of the United States Patent and Trademark Office*